F. KOCH & H. GRANVILL.
AUTOMATIC SHUTTER.
APPLICATION FILED JULY 5, 1917.

1,277,951.

Patented Sept. 3, 1918.
2 SHEETS—SHEET 1.

Inventor
Frank Koch
AND Harry Granvill
By Mason Fenwick Lawrence,
Attorneys

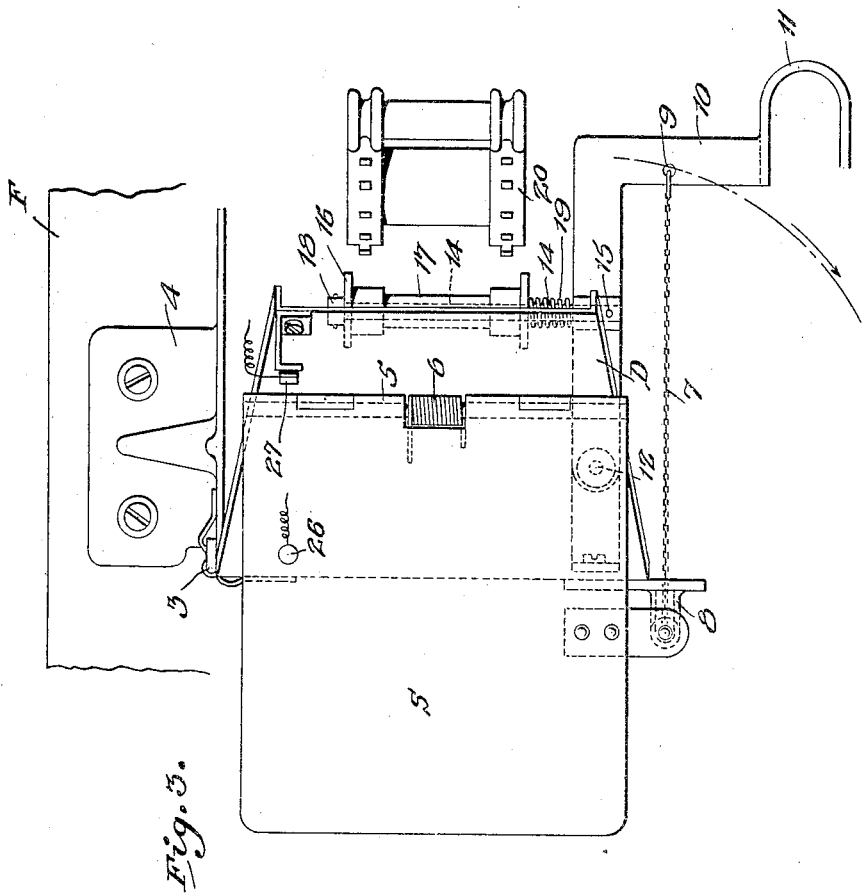

UNITED STATES PATENT OFFICE.

FRANK KOCH AND HARRY GRANVILL, OF SCRANTON, PENNSYLVANIA.

AUTOMATIC SHUTTER.

1,277,951.     Specification of Letters Patent.     Patented Sept. 3, 1918.

Application filed July 5, 1917. Serial No. 178,777.

*To all whom it may concern:*

Be it known that we, FRANK KOCH and HARRY GRANVILL, citizens of the United States, residing at Scranton, in the county of Lackawanna and State of Pennsylvania, have invented certain new and useful Improvements in Automatic Shutters; and do hereby declare the following to be a full, clear, and exact description of the invention, such as will enable others skilled in the art to which it appertains to make and use the same.

This invention relates to motion picture apparatus, and more particularly to an improved automatic shutter for interrupting the passage of the powerful beam of light from the source of light in the apparatus to the film in the event that the latter becomes stationary with relation to the aperture plate of the apparatus. It is one of the objects of the present invention to provide an automatic shutter which is under the control of a film passing through the motion picture apparatus and which shutter is adapted to automatically act to cut off the passage of the beam of light to the film in the event that the latter breaks and becomes stationary in the path of the beam of light. Another object of the present invention is to provide a simple and practicable device which is so arranged in combination with the elements of the apparatus that it may be entirely moved out of the way to permit access to the film actuating guide and wheel; and it is a further object of the present invention to provide means in combination with the shutter for giving an audible alarm in the event of the fracture of the film and the actuation of the shutter to cut off the beam of light.

With the above and other objects in view, as will be made manifest in the following specification, one modification of the invention as illustrated in the accompanying drawings and described in the following specification, in which drawings:—

Fig. 3 is a plan view of the apparatus.

Figure 1:
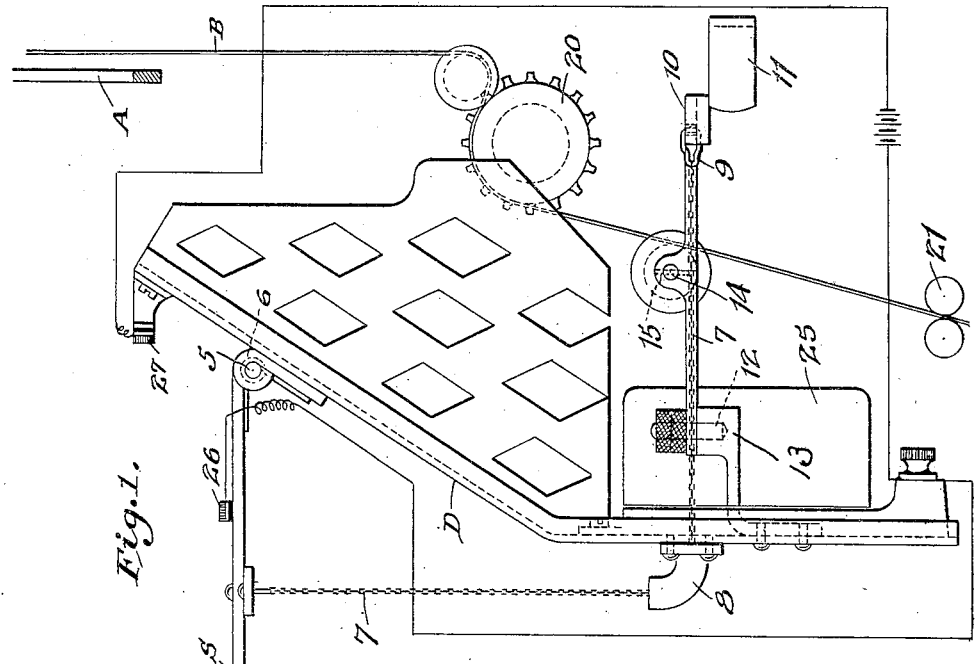
Figure 1 is a side elevation of the automatic shutter control mechanism illustrated as connected with the swinging door which is commonly employed to cover guide rollers and feed sprockets for the films.
Figure 2:
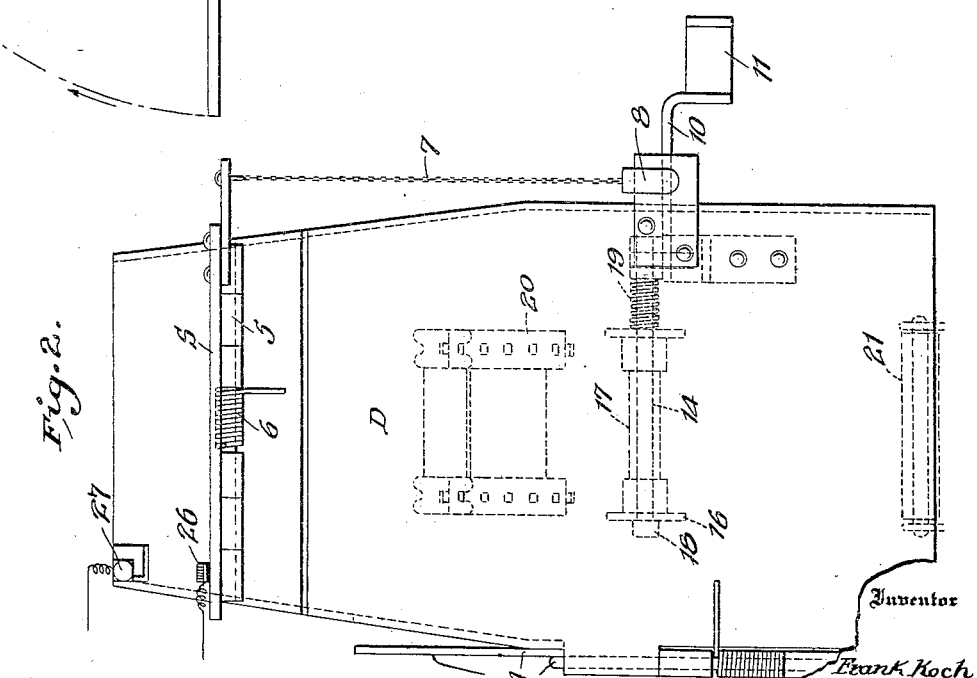
Fig. 2 is a rear elevation of the door with the attached mechanism thereon.

In the accompanying drawings, D represents a door which is hingedly connected at 3 to a bracket or support 4 which may be mounted upon a suitable and convenient portion of the frame F of a form of apparatus to which the device may be applied. The door D is adapted to close over the sprocket wheels which control the operation of the film B through the motion picture apparatus and to provide access to the operating mechanism the door D may be swung open about a pin 3 in a well known manner. The present invention is designed for the purpose of interrupting the beam of light passing from any suitable source in the apparatus through an apertured plate A in the event of the breakage of the film B and thereby prevent the latter from being set on fire by the heat generated from the beam of light. While the present invention may be suitably disposed with relation to the apertured plate, it is desirable as herein illustrated to connect it to the door D so that the control mechanism may be swung out of the way readily to provide access to the interior mechanism behind the door when necessary. Therefore, a shutter S is shown as pivoted at 5 to the top or inclined wall of the door D and is adapted to be thrown to a vertical or closing position through the means of a spring 6 here shown as surrounding the pintle of the hinge 5. Secured to the door or a part thereof is a flexible element in the form of a chain 7 which extends down and back through a guide device shown as an elbow 8 suitably mounted upon the lower portion of the door D which chain 7 thence extends horizontally and is connected at 9 to a lever arm 10 which has a finger hook 11 at its outer end and is pivoted at its rear end upon a pivot pin 12 in a bracket 13 secured to the lower portion of the door D. The relation of the pivot pin 12 of the arm 10 is such, to the elbow or guide 8, that when the arm 10 is swung to the position shown in Fig. 3, the chain 7 is drawn across and the shutter S is swung down to a horizontal position to uncover the apertured plate A, the spring 6 tending to automatically return the shutter S to a vertical position.

At a suitable distance from the pivot pin 12 arm 10 is provided with a transversely extending shaft 14 fixedly connected as by means of a pin 15 to the arm 10 and on the shaft 14 there is mounted a pair of oppositely disposed flanged rollers which are loosely mounted on the shaft 14 and which are spaced apart by a loose roller or tubulous spacer 17. The outer roller 16 is prevented from displacement off of the end of the shaft 14 by any suitable stop as for instance a collar 18. Between the inner roller 16 and the bearing in which the shaft 14 is mounted on the arm 10, there is interposed an expansion spring 19 for yieldingly pressing the rollers 16, 16 toward each other, the spring allowing the rollers to yieldingly separate in such position as determined by the width of the film passing therebetween.

In the adjustment of the device, when the door D is swung closed, the arm 10 is pulled around so as to pull the shutter S down to a horizontal position and at which time the shaft 14 swings in beneath the door and is arranged to bear tangentially upon the film B as it passes from the lower take up feed sprocket 20 to the lower guide roll 21 the tension of the film B supporting the antifriction rollers 16 and holding the shutter S down against the tension of the spring 6 to close the same, the spring acting in the meantime to swing the rollers 16 against the film B. In the event of the severance of the film for any reason, the arm 10 is released because of the film giving away from the rollers 16 and the spring 6 automatically acts through the chain to swing the arm outwardly and the shutter S upwardly to cover the apertured plate A.

For the purpose of providing an audible signal to attract the attention of the operator to the fact that the film has broken and the shutter closed, there may be provided at a suitable location, and preferably mounted on the door D, a suitable electrical bell 25 provided with wires attached to a suitable source of current the circuit of which may be made at a suitable point as for instance by the door D when the latter swings to a vertical position and contacts 26, 27 in the bell circuit brought into closed position.

What is claimed as new is:—

1. In a motion picture apparatus, the combination with feed and guide rollers for a film; of a shutter pivoted on an axis below the light beam and adapted to swing upwardly to vertical position across the beam, means for automatically actuating the shutter to set it across the beam, and film controlled means connected to the shutter for holding it in clear position until released by the film, said actuating means operative to hold the last named means to the film in normal position of the latter.

2. In a motion picture apparatus, the combination with feed and guide means for a film; of a shutter pivoted on a horizontal axis to swing vertically across the light beam, a member pivotally mounted to swing against the tension film, connections between said member and shutter permitting relative movement in planes about pivots at right angles and means for holding the member against the film and for setting the shutter when the film releases the said member.

3. In a motion picture apparatus, feed and guide means between which the film is tensioned, a shutter pivoted on a horizontal axis for covering the aperture plate of the apparatus, means for automatically closing the shutter, means swinging in a horizontal plane to engage the tensioned film between the first named means and connected to the shutter and pressed by the actuating means against the film, and controlled by the latter to release the shutter when the film is slackened or broken.

4. In a motion picture apparatus, a housing including a gate, a shutter pivoted on the gate to swing across the light beam to the film, an arm connected to the shutter and pivoted on an axis at right angles to the axis of the shutter and carrying a pair of rollers to be positioned against the film when the gate is closed, and means for automatically and yieldingly holding the rollers to the film and for closing the shutter when the film yields beyond normal from the rollers.

In testimony whereof we affix our signatures in presence of two witnesses.

FRANK KOCH.
HARRY GRANVILL.

Witnesses:
W. W. BAYLOR,
J. M. SHEFFIELD.

Copies of this patent may be obtained for five cents each, by addressing the "Commissioner of Patents, Washington, D. C."